(12) United States Patent
Tsuboi et al.

(10) Patent No.: US 9,505,127 B2
(45) Date of Patent: Nov. 29, 2016

(54) SELF-PROPELLED ELECTRONIC DEVICE

(71) Applicant: Sharp Kabushiki Kaisha, Osaka-shi, Osaka (JP)

(72) Inventors: Masanori Tsuboi, Osaka (JP); Masashi Matsumoto, Osaka (JP); Mami Yatake, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/370,825

(22) PCT Filed: Dec. 25, 2012

(86) PCT No.: PCT/JP2012/083530
§ 371 (c)(1),
(2) Date: Jul. 7, 2014

(87) PCT Pub. No.: WO2013/108552
PCT Pub. Date: Jul. 25, 2013

(65) Prior Publication Data
US 2014/0379127 A1    Dec. 25, 2014

(30) Foreign Application Priority Data

Jan. 17, 2012 (JP) ................................. 2012-007548

(51) Int. Cl.
*G06F 19/00* (2011.01)
*B25J 9/16* (2006.01)
(Continued)

(52) U.S. Cl.
CPC ............ *B25J 9/1602* (2013.01); *A47L 9/0472* (2013.01); *A47L 9/0477* (2013.01); *A47L 9/0488* (2013.01); *A47L 9/1409* (2013.01); *A47L 9/2805* (2013.01); *A47L 9/2857* (2013.01); *B25J 9/1674* (2013.01); *G05D 1/0214* (2013.01); *A47L 2201/00* (2013.01); *G01J 5/0066* (2013.01); *G05D 2201/0215* (2013.01); *Y10S 901/01* (2013.01); *Y10S 901/46* (2013.01); *Y10S 901/49* (2013.01)

(58) Field of Classification Search
CPC combination set(s) only.
See application file for complete search history.

(56) References Cited

U.S. PATENT DOCUMENTS 5,446,445 A *   8/1995  Bloomfield ............ G08B 17/10
                                                    340/521
6,507,771 B2 *  1/2003  Payton ................. G05D 1/0242
                                                    318/568.1
(Continued)

FOREIGN PATENT DOCUMENTS

CN      201164675 Y     12/2008
JP      10-276947 A     10/1998
(Continued)

OTHER PUBLICATIONS

Official Communication issued in International Patent Application No. PCT/JP2012/083560, mailed on Mar. 19, 2013.

*Primary Examiner* — Jonathan L Sample
(74) *Attorney, Agent, or Firm* — Keating & Bennett, LLP

(57) ABSTRACT

A self-propelled cleaner (1), i.e., a self-propelled electronic device, includes a temperature measurement unit (63) that measures an ambient temperature during self-propelled operation, a temperature decision unit (521) that decides whether the measured ambient temperature is equal to or more than a set value, and an abnormal temperature notification unit (522) that externally reports abnormal temperature information indicating that the measured ambient temperature is equal to or more than the set value if the measured ambient temperature is decided to be equal to or more than the set value.

7 Claims, 12 Drawing Sheets

(51) Int. Cl.
*A47L 9/04* (2006.01)
*A47L 9/14* (2006.01)
*A47L 9/28* (2006.01)
*G05D 1/02* (2006.01)
*G01J 5/00* (2006.01)

(56) References Cited

U.S. PATENT DOCUMENTS

| | | | | |
|---|---|---|---|---|
| 6,650,965 B2 * | 11/2003 | Takagi | ............ | G06N 3/008 318/568.12 |
| 6,754,560 B2 * | 6/2004 | Fujita | ............ | B25J 13/003 318/568.12 |
| 7,240,660 B1 * | 7/2007 | Bryant | ............ | F02D 41/0087 123/299 |
| 7,283,057 B2 * | 10/2007 | Kim | ............ | G08B 25/10 340/628 |
| 7,720,572 B2 * | 5/2010 | Ziegler | ............ | B25J 5/007 340/3.5 |
| 7,761,184 B2 * | 7/2010 | Moridaira | ............ | B25J 9/1674 318/568.12 |
| 8,327,960 B2 * | 12/2012 | Couture | ............ | B25J 5/005 180/9.1 |
| 8,653,967 B1 * | 2/2014 | Vosburgh | ............ | B63B 22/18 340/3.1 |
| 8,892,251 B1 * | 11/2014 | Dooley | ............ | A47L 11/4011 700/245 |
| 2002/0013641 A1 * | 1/2002 | Nourbakhsh | ............ | G05D 1/0214 700/245 |
| 2002/0165638 A1 * | 11/2002 | Bancroft | ............ | A47F 10/00 700/213 |
| 2003/0176947 A1 * | 9/2003 | Estkowski | ............ | G05D 1/0242 700/245 |
| 2003/0229474 A1 * | 12/2003 | Suzuki | ............ | G08B 25/009 702/188 |
| 2005/0000054 A1 * | 1/2005 | Ninomiya | ............ | A47L 7/04 15/347 |
| 2005/0022331 A1 * | 2/2005 | Kim | ............ | A47L 7/04 15/319 |
| 2005/0273226 A1 * | 12/2005 | Tani | ............ | G01C 21/00 701/23 |
| 2006/0047361 A1 * | 3/2006 | Sato | ............ | B25J 5/007 700/245 |
| 2006/0061478 A1 * | 3/2006 | Kim | ............ | G08B 25/10 340/628 |
| 2006/0185858 A1 * | 8/2006 | Baba | ............ | A62C 27/00 169/52 |
| 2008/0132383 A1 * | 6/2008 | Einav | ............ | A61H 1/02 482/8 |
| 2011/0166701 A1 * | 7/2011 | Thacher | ............ | A01D 34/008 700/245 |
| 2011/0190933 A1 * | 8/2011 | Shein | ............ | B62D 55/075 700/258 |
| 2011/0265284 A1 * | 11/2011 | Morgan | ............ | A47L 5/30 15/412 |
| 2013/0231779 A1 * | 9/2013 | Purkayastha | ............ | B25J 9/1697 700/259 |

FOREIGN PATENT DOCUMENTS

| | | |
|---|---|---|
| JP | 2000-342496 A | 12/2000 |
| JP | 2000-342497 A | 12/2000 |
| JP | 2002-224003 A | 8/2002 |
| JP | 2005-046616 A | 2/2005 |
| JP | 2005-135274 A | 5/2005 |
| JP | 2007-117239 A | 5/2007 |

\* cited by examiner

SELF-PROPELLED ELECTRONIC DEVICE

TECHNICAL FIELD

The present invention relates to a self-propelled electronic device with a travel driving unit that is self-propelled, such as a self-propelled cleaner.

BACKGROUND ART

A self-propelled cleaner is self-propelled, true to its name, so an error or exposure to a dangerous environment may occur while the user does not know. Therefore, there is a self-propelled cleaner that reports occurrence of an error with a beeper or a seven-segment display to address this problem.

CITATION LIST

Patent Literature

PTL 1: Japanese Unexamined Patent Application Publication No. 2002-224003 (disclosed on Aug. 13, 2002)
PTL 2: Japanese Unexamined Patent Application Publication No. 10-276947 (disclosed on Oct. 20, 1998)

SUMMARY OF INVENTION

Technical Problem

However, the user cannot clearly recognize what the beeper or seven-segment display indicates, that is, what kind of error has occurred. In addition, it is preferable to make notification not only when an error occurs, but also when the self-propelled cleaner is exposed to a dangerous environment. For example, if the self-propelled cleaner stops temporarily in front of a stove or other heaters during self-propelled operation, it may heat, fire, or smoke. As described above, if a self-propelled electronic device such as self-propelled cleaner is exposed specifically to a dangerous temperature environment, it may suffer a failure or accident. Accordingly, it is necessary to report such a dangerous situation immediately and clearly to the user. Although some manual cleaners have temperature sensing means such as those described in PTL 1 and PTL 2, the temperature sensing means measures the temperature inside the cleaner, not the temperature surrounding the cleaner.

The present invention addresses the above problems with the object of providing a self-propelled electronic device that can report exposure to a dangerous temperature environment immediately and clearly during self-propelled operation, to the user.

Solution to Problem

To solve the above problem, a self-propelled electronic device with a travel driving unit according to an aspect of the present invention includes a temperature measurement unit that measures an ambient temperature during self-propelled operation, a temperature decision unit that decides whether the ambient temperature measured by the temperature measurement unit is equal to or more than a set value, an abnormal temperature notification unit that externally reports abnormal temperature information indicating that the measured ambient temperature is equal to or more than the set value if the temperature decision unit decides that the measured ambient temperature is equal to or more than the set value.

Advantageous Effects of Invention

According to an aspect of the present invention, if the self-propelled electronic device decides an ambient temperature measured during self-propelled operation is equal to or more than a set value, the self-propelled electronic device can externally report abnormal temperature information indicating that the measured ambient temperature is equal to or more than the set value. This prompts the user to avoid the self-propelled electronic device from being exposed to a dangerous temperature environment.

As described above, with the above structure, if the self-propelled electronic device is exposed to a dangerous temperature environment during self-propelled operation, the self-propelled electronic device can report the fact immediately and clearly to the user. The use can recognize that the self-propelled electronic device is exposed to a dangerous temperature environment and avoids the self-propelled electronic device from being exposed to such a state, thereby preventing the self-propelled electronic device from heating, firing, smoking, or the like, for example. This prevents the self-propelled electronic device from suffering a failure or accident. As described above, with the above structure, the self-propelled electronic device with a high level of safety can be provided.

DESCRIPTION OF EMBODIMENTS

A self-propelled electronic device according to the present invention will be described below when the self-propelled electronic device is applied to a self-propelled cleaner as an embodiment of the present invention.

Embodiment 1

Figure 1:
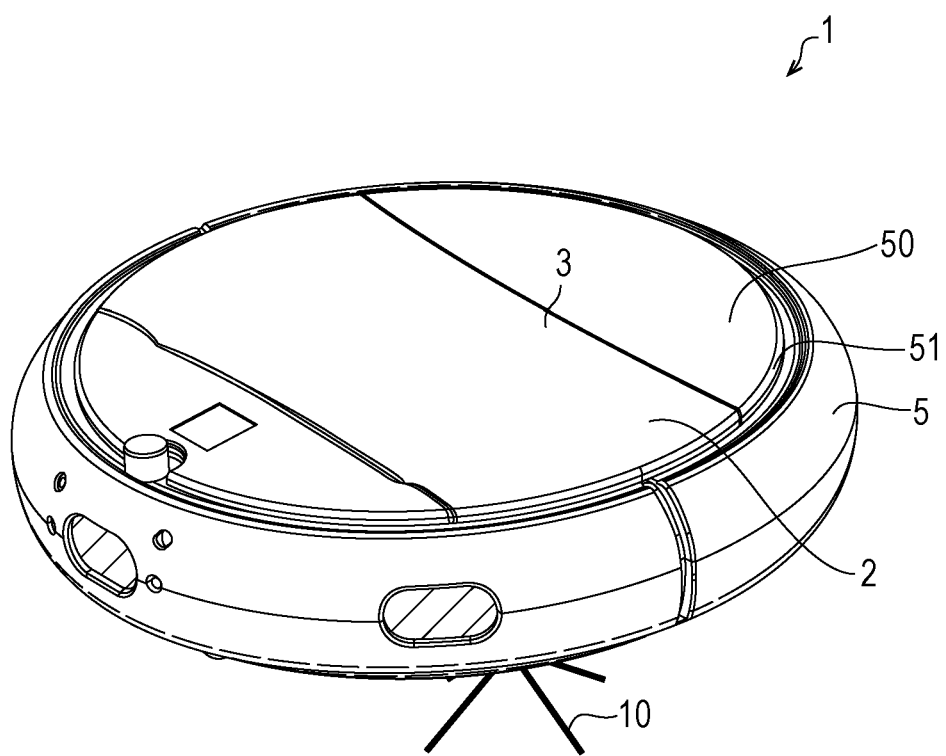
FIG. 1 is a perspective view of a self-propelled cleaner according to an embodiment of the present invention.
Figure 2:
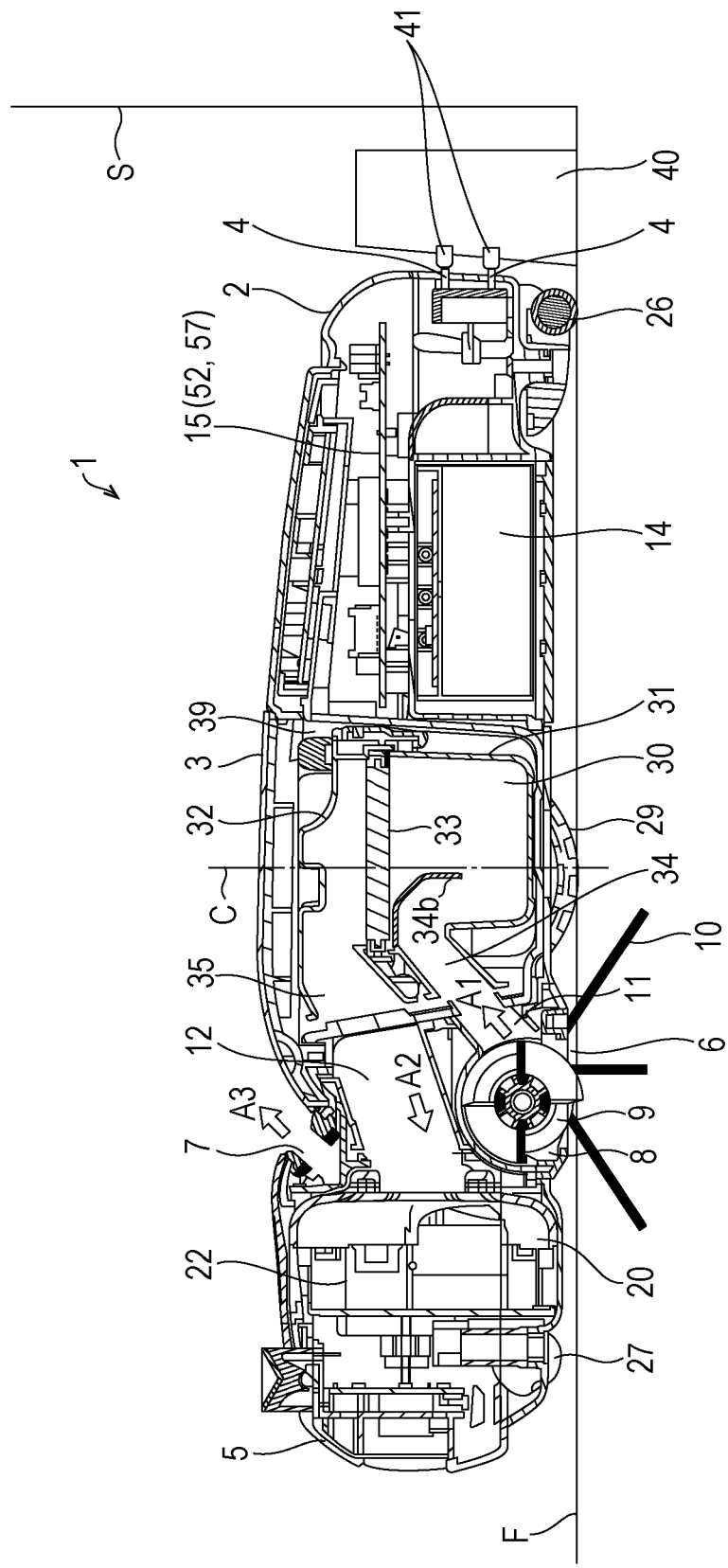
FIG. 2 is a side sectional view of the self-propelled cleaner.
Figure 3:
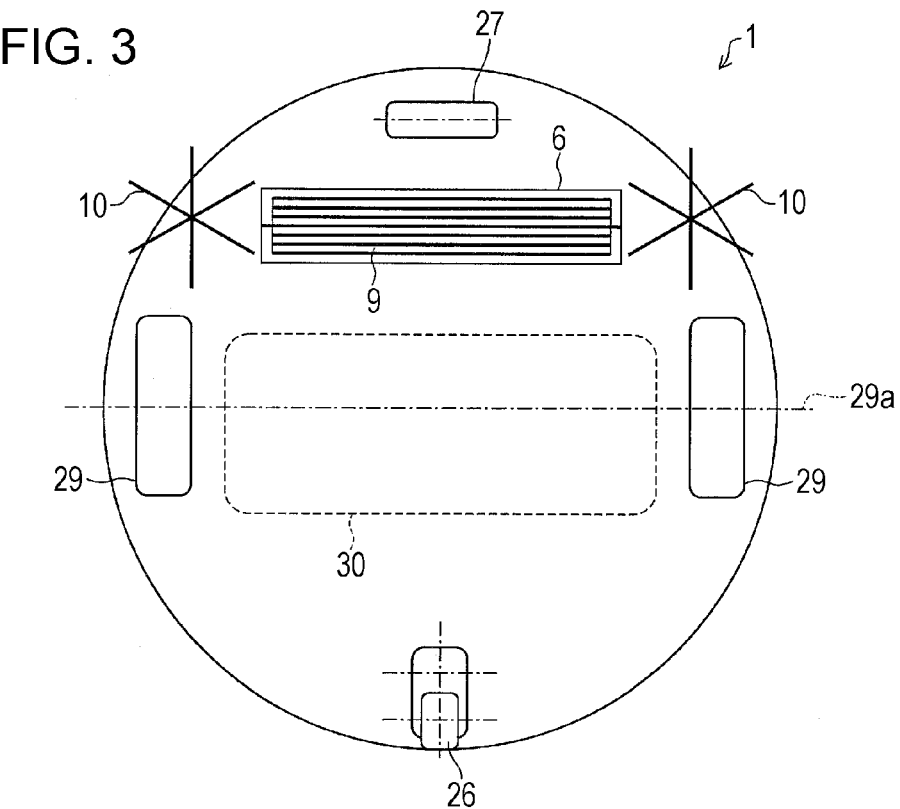
FIG. 3 is a bottom view of the self-propelled cleaner.

FIGS. 1 to 3 are perspective view, side sectional view, and bottom view, respectively, showing a self-propelled cleaner 1 according to the present embodiment.

The self-propelled cleaner (self-propelled electronic device) 1, which collects dust (that is, performs cleaning) during self-propelled operation, includes the main body of the self-propelled cleaner 1, which is formed of a main body cabinet 2 having an outer frame of a circular shape in plan view as shown in FIG. 1, and driven wheels 29, which are driven by a battery (secondary battery) 14 as a power supplying source as shown in FIGS. 2 and 3.

As shown in FIG. 1, an operation panel 50, which inputs an instruction for the self-propelled cleaner 1, a light emitting diode (LED) lamp 51, and a lid 3, which is closed or opened to output or input a dust collector 30, are disposed on an upper surface of the main body cabinet 2. Although the upper surface and lower surface of the main body cabinet 2 are circular in the present embodiment, they are not limited to a circle.

In the present embodiment, the LED lamp 51 is disposed around the perimeter of the upper surface of the main body cabinet 2, and its illumination color and illumination pattern change depending on the state of the self-propelled cleaner 1, as described later. Lamps other than the LED lamp may be provided. The LED lamp may be disposed in the vicinity of an air outlet opening 7, which is disposed on the upper surface of the main body.

The operation panel 50 includes operation switches (operation unit) that receive the input of data such as various instructions, characters, and numerals from the user and a display (display unit) that indicates various types of information to be provided for the user. The operation panel 50 may be provided as a touch panel. Display LEDs may be disposed on the operation panel 50.

Figure 4:
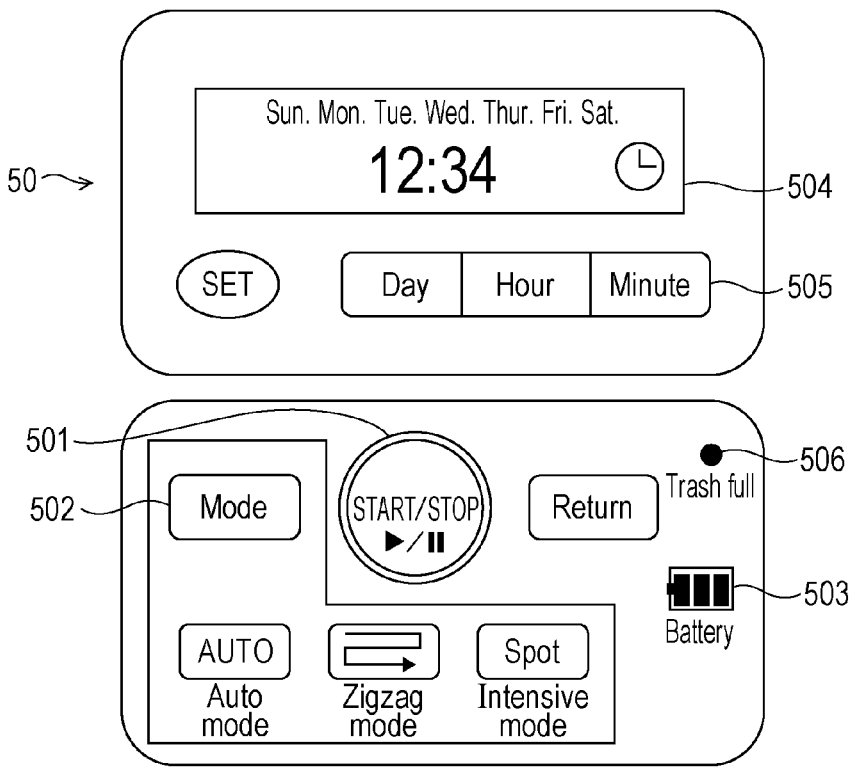
FIG. 4 shows an example of an operation panel of the self-propelled cleaner.

FIG. 4 shows an example of the operation panel 50. The operation panel 50 in FIG. 4 includes a START/STOP button 501, which instructs the start or stop of cleaning, a Mode selection button 502, which selects a cleaning mode, timer set buttons 505, which are used to set the current time or reservation time at which the self-propelled cleaner 1 is started, a time display unit 504, which indicates the current time and reservation time, and a Trash full lamp 506, which lights when a dust container 31 described later becomes full. In addition, the operation panel 50 displays a Battery mark 503, which indicates the amount of charge of the battery 14. These are only examples and the operation panel 50 may include other operation units and display units that achieve other functions.

As shown in FIGS. 2 and 3, a pair of driven wheels 29 is disposed in the bottom of the main body cabinet 2. The driven wheels 29 project from the bottom and rotate about a rotary axis 29a disposed horizontally. The rotary axis 29a of the driven wheels 29 intersects with center line (center axis) C of the main body cabinet 2. When both of the driven wheels 29 rotate in the same direction, the self-propelled cleaner 1 moves forward or backward. When the driven wheels 29 rotate in different directions, the self-propelled cleaner 1 rotates about center line C of the main body cabinet 2. The self-propelled cleaner 1 is self-propelled by the battery 14 driving the driven wheels 29. In the following description, the front of the movement direction when the self-propelled cleaner 1 performs cleaning while being self-propelled is called the forward direction and the rear of the movement direction is called the backward direction. The motion along the movement direction during cleaning is called forward movement and the motion opposite to the movement direction during cleaning is called backward movement. In addition, the part of a circumferential surface (side surface) of the main body cabinet 2 during cleaning that faces the forward direction is called a front surface and the part opposite to the front surface is called a back surface. The back surface faces the movement direction during backward movement.

If the main body cabinet 2 reaches an end of the cleaning area or makes contact with an obstacle in the path, the driven wheels 29 are stopped. Then, the driven wheels 29 rotate in mutually different directions and the main body of the self-propelled cleaner 1 rotates about center line C of the main body cabinet 2 to change its orientation. This enables the self-propelled cleaner 1 to be self-propelled in the entire cleaning area while avoiding obstacles. The driven wheels 29 may be rotated in the direction opposite to the direction in the forward movement to move the self-propelled cleaner 1 backward.

A suction opening 6 is disposed in a front portion in the bottom of the main body cabinet 2. The suction opening 6 is formed through an open plane of a concave portion 8 disposed in the bottom of the main body cabinet 2 so as to face floor F. In the concave portion 8, there are a rotary brush 9 that rotates about a horizontal rotary axis and side brushes 10 on both sides of the concave portion 8 that rotate about vertical rotary axes.

In addition, in the bottom of the main body cabinet 2, there is a front wheel 27 of a roller shape in front of the suction opening 6. In addition, there is the rear wheel 26 including a swivel wheel at the back end (rear end) in the bottom of the main body cabinet 2. The weight of the self-propelled cleaner 1 distributed in the forward/backward direction with respect to the driven wheels 29 disposed in the middle of the main body cabinet 2. Cleaning is performed with the front wheel 27 kept away from floor F and the rotary brush 9, the driven wheels 29, and the rear wheel 26 in contact with the floor F. Accordingly, dust in front of the movement path is lead to the suction opening 6 without being blocked by the front wheel 27. The front wheel 27 makes contact with a step that appears in the movement path so that the self-propelled cleaner 1 can easily climb over the step.

A bumper 5 is disposed on the perimeter of the main body cabinet 2 to buffer impacts and vibrations applied to the main body of the self-propelled cleaner 1. Upon detecting contact between the bumper 5 and an obstacle during movement, the self-propelled cleaner 1 changes the movement direction and continues travelling.

Charging terminals 4 for charging the battery 14 are disposed in an exposed manner at the rear end of the circumferential surface (side) of the main body cabinet 2. Although the present invention has two charging terminals 4 at upper and lower positions at the rear end of the circumferential surface of the main body cabinet 2, one charging terminal 4 or three or more charging terminals 4 may be provided. The self-propelled cleaner 1 returns to the position where a charger 40 is disposed upon completion of cleaning or if the amount of charge of the battery 14 becomes less than a predetermined value.

Then, the self-propelled cleaner 1 charges the battery 14 with the charging terminals 4 in contact with the power feeding terminals 41 disposed on the charger 40. The rear surface (the surface not facing the circumferential surface of the main body cabinet 2) of the charger 40 to be connected to the commercial power source is generally disposed along wall S of a room. The charger 40 will be described later.

The battery 14 supplies electric power to the entire self-propelled cleaner 1. The battery 14 is preferably a rechargeable battery with large capacity. For example, a lead-acid battery, nickel hydride battery, lithium ion battery, capacitor, or the like may be used.

The dust collector 30 for collecting dust is disposed in the main body cabinet 2. The dust collector 30 is disposed above the rotary axis 29a of the driven wheels 29 so as to be housed in a dust collecting chamber 39 disposed in the main body cabinet 2. Since the dust collector 30 is disposed above the rotary axis 29a of the driven wheels 29, the weight of the main body cabinet 2 is balanced even if the weight is increased by collected dust. The dust collecting chamber 39 includes a separate chamber covered by circumferential surfaces in four directions and a bottom and the rotary brush 9 and the separate chamber extends in the direction of the shaft of the rotary brush 9 so as to separate the inside of the main body cabinet 2. The planes of dust collecting chamber 39 excluding the front plane extending in the direction of the shaft of the rotary brush 9 are closed. A first air inlet path 11 that communicates with the concave portion 8 and a second air inlet path 12, located above the concave portion 8, that communicates with a motor unit 20 are disposed on the front plane of the dust collecting chamber 39.

Figure 5:
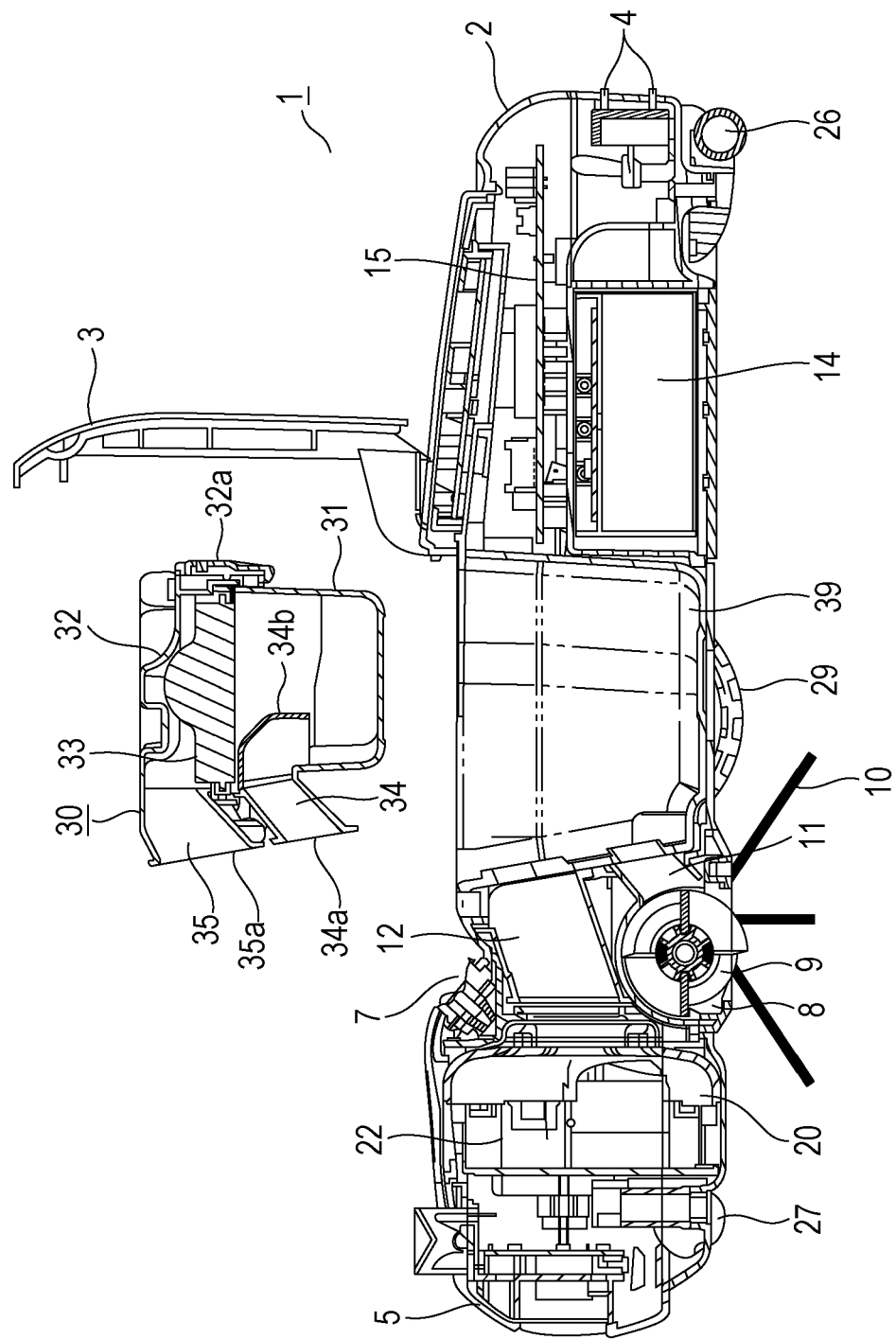
FIG. 5 is a side sectional view of the self-propelled cleaner in a state in which a lid of a main body cabinet is opened and a dust collector has been removed.

The dust collector 30 can be inserted into or removed from the main body cabinet 2 by opening the lid 3 of the main body cabinet 2 as shown in FIG. 5. The dust collector 30 includes the dust container 31 with a bottom and an upper cover 32 with a filter 33 disposed above the dust container 31. The upper cover 32 is secured to the dust container 31b a movable latch 32a and the upper surface of the dust container 31 opened or closed by operating the latch 32a. This allows dust collected in the dust container 31 to be discarded.

An inflow path 34, having an inflow opening 34a at its tip, that communicates with the first air inlet path 11 is disposed in the circumferential surface of the dust container 31. An inflow section 34b, successive to the inflow path 34, that guides an air flow downward through bending is disposed in the dust container 31. An outflow path 35, having an outflow opening 35a at its tip, that communicates with the second air inlet path 12 is disposed in the circumferential surface of the upper cover 32.

Gaskets (not shown) are disposed on the rims of the inflow opening 34a and the outflow opening 35a so as to make close contact with the front plane of the dust collecting chamber 39. This hermetically seals the inside of the dust collecting chamber 39, which accommodates the dust collector 30. An open plane of the inflow opening 34a, an open plane of the outflow opening 35a, and the front plane of the dust collecting chamber 39 are formed as slant planes to prevent the gaskets from degrading due to sliding accompanying the removal and insertion of the dust collector 30.

A control board 15 is disposed at the upper rear of the dust collecting chamber 39 in the main body cabinet 2. A control unit 52 (described later), which controls components of the self-propelled cleaner 1, and a storage unit 57 (described later), which stores various types of data, are disposed on the control board 15. The detachable battery 14 is disposed at the lower rear of the dust collecting chamber 39. The battery 14 is charged from the charger 40 via the charging terminals 4 and supplies electric power to the control board 15, the driven wheels 29, the rotary brush 9, the side brush 10, an electric air blower 22, and other components.

If cleaning operation is instructed in the self-propelled cleaner 1 with the above structure, electric power is supplied from the battery 14, and the electric air blower 22, an ion generating device 62 described later, the driven wheels 29, the rotary brush 9, and the side brush 10 are driven. This brings the rotary brush 9, the driven wheels 29, and the rear wheel 26 of the self-propelled cleaner 1 contact with the floor F, and the self-propelled cleaner 1 is self-propelled in a predetermined cleaning area and sucks air including dust on the floor F from the suction opening 6. At this time, rotation of the rotary brush 9 sweeps dust on the floor F upward and guides it in the concave portion 8. In addition, rotation of the side brush 10 guides dust on the side of the suction opening 6 toward the suction opening 6.

The air flow sucked from the suction opening 6 circulates backward in the first air inlet path 11 as indicated by arrow A1 in FIG. 2 and enters the dust collector 30 via the inflow opening 34a. Dust in the air flow that entered the dust collector 30 is collected by the filter 33 and the air flow is exhausted from the dust collector 30 via the outflow opening 35a. This causes dust to be collected and accumulated in the dust container 31. The air flow exhausted from the dust collector 30 circulates forward in the second air inlet path 12 as indicated by arrow A2 and enters the electric air blower 22 of the motor unit 20.

The air flow that passed through the electric air blower 22 is exhausted to the upper rear as indicated by arrow A3 from the air outlet opening 7 disposed on the upper surface of the main body cabinet 2. An ion generating device (not shown) is disposed in the vicinity of the electric air blower 22 and an air flow including ions is exhausted from the air outlet opening 7.

While the room is cleaned as described above, ions included in exhausted air from the self-propelled cleaner 1 that is being self-propelled are distributed within the room for sterile filtration and deodorization. Since the air is exhausted upward from the air outlet opening 7 at this time, it is possible to improve the cleanliness of the room by preventing dust on floor F from rolling up.

A part of an air flow including ions flowing through the second air inlet path 12 may be configured so as to be guided to the concave portion 8. In such a configuration, an air flow to be guided from the suction opening 6 to the first air inlet path 11 includes ions. This enables sterile filtration and deodorization of the dust container 31 and the filter 33 of the dust collector 30.

The charger 40 charges the battery 14 of the self-propelled cleaner 1 and incorporates a charging circuit for controlling the charging of the battery 14 and other components.

Figure 6:
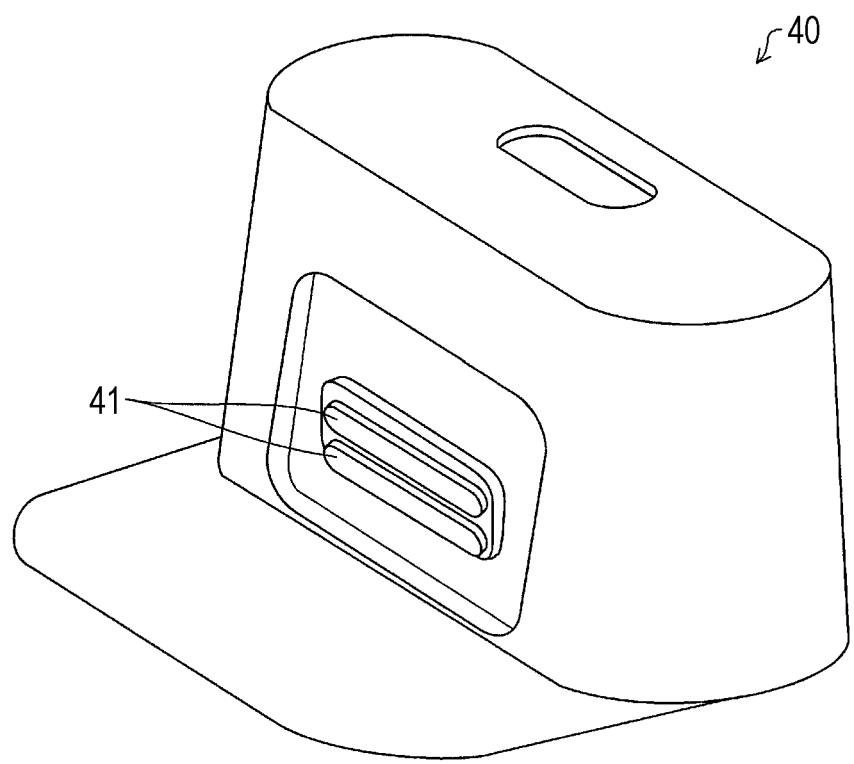
FIG. 6 is a perspective view of a charger for charging the self-propelled cleaner.
Figure 7:
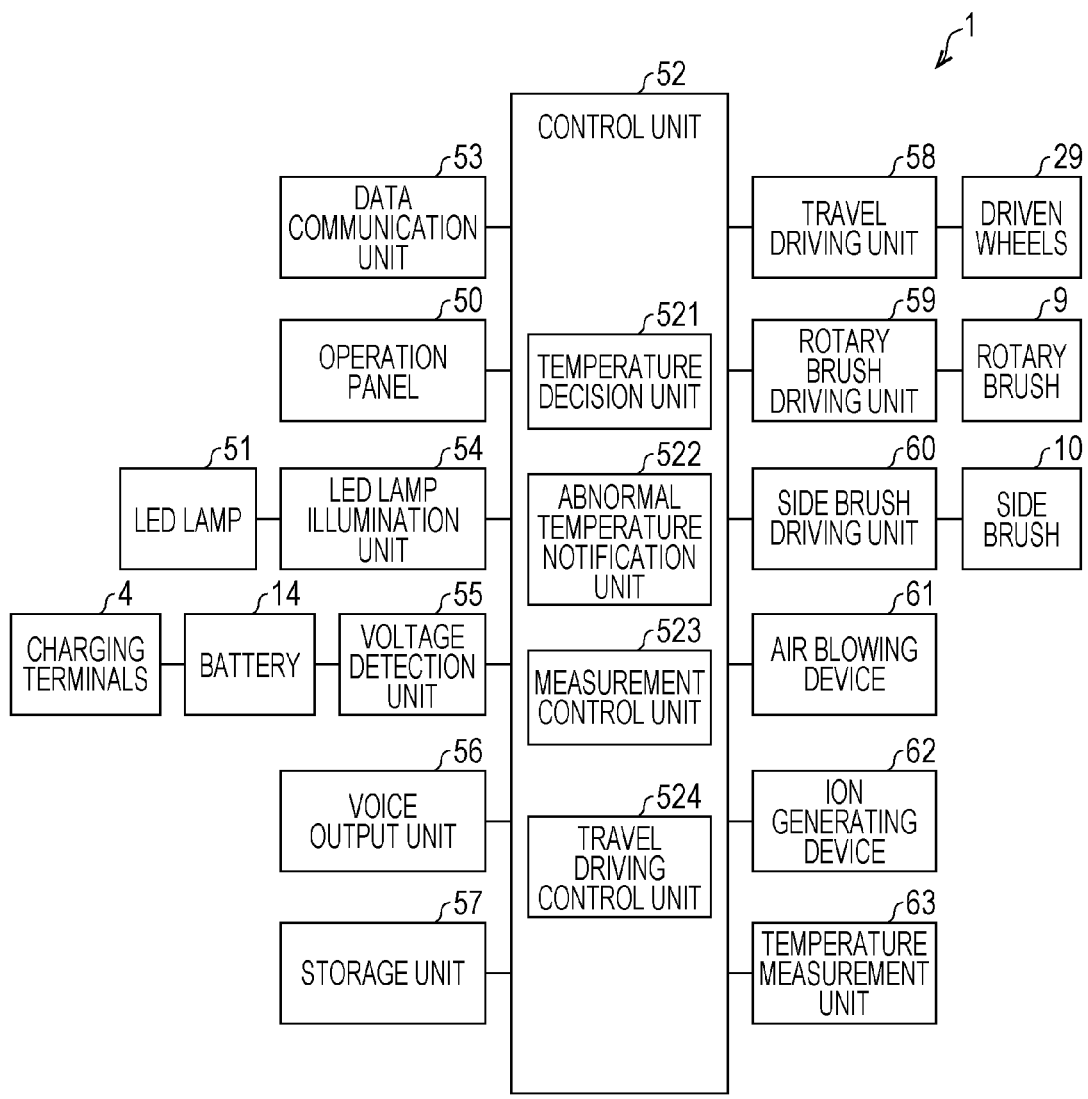
FIG. 7 is a block diagram showing the functional structure of the self-propelled cleaner.

As shown in FIG. 6, as many power feeding terminals 41 as the charging terminals 4 of the self-propelled cleaner 1 are disposed in positions on the front surface (surface facing the circumferential surface of the main body cabinet 2) of the charger 40 capable of making contact with the charging terminals 4 of the self-propelled cleaner 1. In a state where no connection is made, the power feeding terminals 41 projects from the front surface of the charger 40 and the end surfaces of the power feeding terminals 41 can be pressed until the end surfaces is substantially flush with the front surface of the charger 40. If the end surface of the power feeding terminals 41 is pressed until the end surface is substantially flush with the front surface of the charger 40 with the charging terminals 4 of the self-propelled cleaner 1 in contact (electrical connection) with the power feeding terminals 41 of the charger 40, conduction with the contact is made and current from the commercial power source to which the charger 40 is connected flows through the self-propelled cleaner 1. In this state, the battery 14 can be charged.

The charger 40 is configured to transmit a feedback signal indicating the installation place of the charger 40 and the position of the power feeding terminals 41. If completion of cleaning is sensed or the amount of charge of the battery 14 becomes less than a predetermined value, the self-propelled cleaner 1 senses the feedback signal transmitted from the charger 40 and automatically returns to the installation place of the charger 40. Completion of cleaning may be sensed by deciding that, for example, the self-propelled cleaner 1 has moved a certain distance or consumed a certain time or by checking the cleaning status of cleaned area using a sensor or the like. Alternatively, completion of cleaning may be sensed when the self-propelled cleaner 1 receives an instruction (for example, a cleaning completion instruction or cleaning interruption instruction) for prompting the self-propelled cleaner 1 to return to the charger 40 from the operation panel 50, a remote controller, which is described later, or a terminal device connected via radio communication.

In the present embodiment, an infrared signal is used as the feedback signal indicating the installation place of the charger 40 and the position of the power feeding terminals 41, but a signal other than an infrared signal may be used. The feedback signal is transmitted at all times if the charger 40 is connected to the commercial power source and the self-propelled cleaner 1 is away from the charger 40.

In the present embodiment, the self-propelled cleaner 1 moves forward (that is, moves with its front surface facing the movement direction) when sensing the feedback signal and stops temporarily when returning to the vicinity of the installation position of the charger 40. Then, the self-propelled cleaner 1 rotates about center line C of the main body cabinet 2 until the charging terminals 4 faces the power feeding terminals 41. Then, the main body cabinet 2 starts moving backward (that is, moving with its back surface facing the movement direction). The self-propelled cleaner 1 further moves backward after the charging terminals 4 makes contact with the power feeding terminals 41. When the end surface of the power feeding terminals 41 in contact with the charging terminals 4 a position (docking position where pressing by the power feeding terminals 41 ceases) where it is substantially flush with the front surface of the charger 40, the self-propelled cleaner 1 senses energization from the power feeding terminals 41 and stops moving backward. In this stop state, charging is performed. Known techniques can be used for processes related to returning of the self-propelled cleaner 1 and docking between the charging terminals 4 and the power feeding terminals 41 (docking between the self-propelled cleaner 1 and the charger 40).

The docking between the charging terminals 4 and the power feeding terminals 41 can be achieved by, for example, moving the self-propelled cleaner 1 backward while sensing the feedback signal with a rear sensor disposed on the back surface (back end) of the main body cabinet 2. If the rear sensor does not sense the feedback signal, the self-propelled cleaner 1 is rotated forward (clockwise) or backward (counterclockwise) about center line C of the main body cabinet 2 slightly until the feedback signal is sensed and then the self-propelled cleaner 1 is moved backward. As described above, moving the main body cabinet 2 backward while sensing the feedback signal at all times enables alignment between the charging terminals 4 and the power feeding terminals 41.

The rear sensor and the charging terminals 4 are preferably disposed in a line parallel to the rotary axis 29a of the driven wheels 29. In such a case, the self-propelled cleaner 1 can move backward while the rear sensor is sensing the feedback signal from the charger 40 so as to connect the charging terminals 4 to the power feeding terminals 41 appropriately.

In addition, the self-propelled cleaner 1 may be configured to be able to the electric air blower 22 when the charging terminals 4 and the power feeding terminals 41 are connected to each other (that is, when the battery 14 is being charted or has been charged) depending on the setting. In such a configuration, an air flow including ions is released to the upper rear from the air outlet opening 7 during or upon completion of charge. Since the charging terminals 4 are disposed at the rear end of the main body cabinet 2, an air flow including ions circulates toward the charger 40. When the back of the charger 40 faces side wall S of the room, the air flow including ions rises along side wall S. The air flow circulates along the ceiling and opposite side walls of the room. Accordingly, ions circulate throughout the room, thereby improving sterile filtration and deodorization effects.

The self-propelled cleaner 1 may be configured to have an environment sensing unit such as an odor sensor and, depending on the state of a surrounding environment sensed by the environment sensing unit, stay at a particular point for a certain time and release an air flow including ions from the air outlet opening 7.

In the present embodiment, the self-propelled cleaner 1 can be operated not only by the operation panel 50 included therein, but also by a remote controller (not shown) via infrared communication such as IrDA or IrSS®. The self-propelled cleaner 1 can also be operated by a terminal device (not shown) such as a smart phone, mobile phone, or tablet terminal connected via radio communication such as Bluetooth®, WiFi®, or ZigBee®. In addition, data can be transmitted from the self-propelled cleaner 1 to a terminal device connected via radio communication. That is, the self-propelled cleaner 1 can communicate with a terminal device connected through a radio frequency system bi-directionally. The self-propelled cleaner 1 may be connected to a wide area wireless network. In this case, the self-propelled cleaner 1 can be operated from a terminal device connected to the wide area wireless network. In addition, a voice input operation may be enabled for the self-propelled cleaner 1.

In addition, the self-propelled cleaner 1 is configured to output voice data stored therein. The self-propelled cleaner 1 includes a temperature measurement unit 63 that measures the ambient temperature of the self-propelled cleaner 1 and, if the ambient temperature is equal to or more than a set value, outputs a voice reporting the fact. This process will be described later.

In addition, the self-propelled cleaner 1 includes various sensors for enabling self-propelled operation without dropping from steps or stairs by avoiding obstacles. For example, a cliff sensor (sensor for sensing steps), obstacle detection sensor, motion detection sensor, and charge-coupled device (CCD) camera may be used as these sensors. The sensors are only examples and the sensors do not need to be included. A cliff sensor or motion detection sensor may be configured using an infrared sensor, for example. An obstacle detection sensor may be configured using an ultrasonic sensor, for example.

The self-propelled cleaner 1 may include, for example, an acceleration sensor, distance detection sensor, angle sensor, and so on in order to control operation during cleaning. The self-propelled cleaner 1 may include, for example, an odor sensor and so on in order to control cleaning depending on the sensed results.

The self-propelled cleaner 1 is described as a suction cleaner in the present embodiment, but the self-propelled cleaner 1 is applicable to a mop cleaner, for example. The self-propelled cleaner 1 may be not only for domestic use, but also for industrial use. In the present embodiment, the self-propelled cleaner 1 includes the ion generating device 62, but it does not need to include the ion generating device 62.

(Functional Structure of the Self-Propelled Cleaner)

Next, the functional structure of the self-propelled cleaner 1 will be described. As shown in the drawings, the self-propelled cleaner 1 includes the control unit 52, a data communication unit 53, the operation panel 50, an LED lamp illumination unit 54, the LED lamp 51, a voltage detection unit 55, the charging terminals 4, the battery 14, a voice output unit 56, the storage unit 57, a travel driving unit 58, a rotary brush driving unit 59, the rotary brush 9, a side brush driving unit 60, the side brush 10, the driven wheels 29, an air blowing device 61, the ion generating device 62, and the temperature measurement unit 63. Descriptions of the components described above will be omitted.

The control unit 52 is a block that controls various types of operation of the self-propelled cleaner 1 based on a program and data stored in the storage unit 57 and a program and data input from the above operation panel 50, the above remote controller, the above terminal device connected via radio communication.

The data communication unit 53 is a block that exchanges data with external devices. The data communication unit 53 receives controls signals and so on for controlling the self-propelled cleaner 1, from the above remote controller and the above terminal device connected via radio communication. In addition, The data communication unit 53 transmits data stored in the self-propelled cleaner 1 or data that can be measured by the self-propelled cleaner 1 to the terminal device connected via radio communication. The data communication unit 53 also receives a feedback signal from the charger 40.

The LED lamp illumination unit 54 is a block that controls the illumination of the LED lamp 51 by supplying driving current to the LED lamp 51. The LED lamp illumination unit 54 changes the color and pattern of illumination depending on the state of the self-propelled cleaner 1. For example, the color and pattern of illumination may be changed depending on the mode: cleaning mode indicating that cleaning is in progress, charging mode indicating that charging is in progress, ion generating mode indicating that ion generation is in progress without cleaning (ion generation will be described later), or emergency mode indicating occurrence of an emergency.

The voltage detection unit 55 is a block that detects the voltage of the battery 14. The amount of charge of the battery 14 is obtained from the detected voltage. The battery 14 is configured to be electrically connected to the charging terminals 4.

The voice output unit 56 is a voice output device such as a speaker. The voice output unit 56 is a block that output voice externally according to voice data stored in the storage unit 57.

The storage unit 57 stores (1) a control program executed by the control unit 52 of the self-propelled cleaner 1, (2) an OS program executed by the control unit 52, (3) application programs used by the control unit 52 to execute various functions of the self-propelled cleaner 1, and (4) various types of data read to execute the application programs. The storage unit 57 also stores (5) data used for calculation when the control unit 52 executes various functions and the results of calculation. For example, data (1) to (4) is stored in a non-volatile memory such as a read only memory (ROM), flash memory, erasable programmable ROM (EPROM), electrically EPROM (EEPROM®), or hard disc drive (HDD). For example, data (5) is stored in a volatile memory such as random access memory (RAM).

In addition, the storage unit 57 stores various condition settings related to the self-propelled cleaner 1, which are received from the operation panel 50 or from the above remote controller or the above terminal device via the data communication unit 53. In addition, the storage unit 57 may store a travel map around the installation place of the self-propelled cleaner 1. The travel map indicates information about travel such as the travel route and travel speed of the self-propelled cleaner 1 or information about a cleaning area. The travel map may be in advance set and stored in the storage unit 57 by the user or may be stored automatically by the self-propelled cleaner 1.

The travel driving unit 58 is a block that includes a motor driver, a driven wheel motor, and so on, determines the rotation direction, rotation angle, and so on based on a control signal from the control unit 52, and drives the driven wheels 29.

The rotary brush driving unit 59 is a block that includes a motor driver, a rotary brush motor, and so on, determines the number of rotations and so on based on a control signal from the control unit 52, and drives the rotary brush 9.

The side brush driving unit 60 is a block that includes a motor driver, a side brush motor, and so on, determines the number of rotations and so on based on a control signal from the control unit 52, and drives the side brush 10.

The air blowing device 61 is equivalent to the motor unit 20, includes the electric air blower 22 and so on, and draws air into or exhausts air from the main body cabinet 2.

The ion generating device 62 generates ions when driven on the basis of a control signal from the control unit 52. Details on the ion generating device 62 will be described in embodiment 2. Ions generated by the ion generating device 62 are exhausted by the air blowing device 61 externally from the main body cabinet 2. The self-propelled cleaner 1 can perform cleaning and ion generation at the same time or can perform one of these operations individually under control of the control unit 52.

The temperature measurement unit 63 is a temperature sensor (including a thermistor, for example) that measures the temperature surrounding the self-propelled cleaner 1.

In the self-propelled cleaner 1 according to the present embodiment, the control unit 52 includes a temperature decision unit 521 that decides whether the ambient temperature measured by the temperature measurement unit 63 is equal to or more than a set value and an abnormal temperature notification unit 522 that externally reports abnormal temperature information indicating that the measured ambient temperature is equal to or more than the set value if the temperature decision unit 521 decides that the measured ambient temperature is equal to or more than the set value. The set temperature value may be set during shipment of the self-propelled cleaner 1 or may be set by the user using the operation panel 50 or the like as necessary.

The abnormal temperature notification unit 522 performs an external notification by causing the voice output unit 56 to output the above abnormal temperature information as voice information. Alternatively, the abnormal temperature notification unit 522 provides notification by causing the data communication unit 53 to transmit the above abnormal temperature information to an external terminal device. Either or both of reporting through voice output and reporting through transmission to an external terminal device may be performed.

The above abnormal temperature information only needs to report to the user that the temperature environment is equal to or more than the set value, such as, for example, "Hot" or "Abnormal temperature". Reporting to an external terminal device may be performed by mail, voice output from the application of a terminal device that receives the abnormal temperature information, or animation indicating that the self-propelled cleaner 1 is exposed to a dangerous temperature environment.

With the above structure, if the self-propelled cleaner 1 decides an ambient temperature measured during self-propelled operation is equal to or more than a set value, the self-propelled cleaner 1 can externally report abnormal temperature information indicating that the measured ambient temperature is equal to or more than the set value. This prompts the user to avoid the self-propelled cleaner 1 from being exposed to a dangerous temperature environment.

As described above, the self-propelled cleaner 1 can report exposure to a dangerous temperature environment immediately and clearly to the user through voice output or transmission to an external terminal device. The use can recognize that the self-propelled cleaner 1 is exposed to a dangerous temperature environment and avoids the self-propelled cleaner 1 from being exposed to such a state, thereby preventing the self-propelled cleaner 1 from heating, firing, smoking, or the like, for example. This prevents the self-propelled cleaner 1 from suffering a failure or accident. As described above, the self-propelled cleaner 1 can ensure safety.

The control unit 52 further includes a measurement control unit 523 that decides whether a certain time has elapsed after the temperature decision unit 521 decides that the measured temperature is equal to or more than the set value and, if the certain time has elapsed, causes the temperature measurement unit 63 to perform temperature control again. Accordingly, when a certain time has passed after the measured temperature is decided to be a set value or more, the temperature measurement unit 63 measures the ambient temperature again. If the ambient temperature measured is equal to or more than a set value, the abnormal temperature notification unit 522 externally reports abnormal temperature information again. Accordingly, if the self-propelled electronic device is not avoided from the dangerous temperature state even when the temperature is measured again, it is possible to prompt the user to further avoid the state. On the other hand, if the ambient temperature measured is less than the set value, it is not necessary to externally report abnormal temperature information, thereby avoiding the transmission of unnecessary reports. In addition, the user can recognize that the self-propelled cleaner 1 can be avoided from the dangerous temperature state.

The control unit 52 further includes a travel driving control unit 524 that causes the travel driving unit 58 to move the self-propelled cleaner 1 to an area where the measured temperature is equal to or less than a set value if the temperature decision unit 521 decides the measured temperature to be equal to or more than a set value. Accordingly, the self-propelled cleaner 1 can move to an area where the measured temperature does not exceed the set value if the measured temperature is equal to or more than the set value during self-propelled operation. Accordingly, even if the self-propelled cleaner 1 is exposed to a dangerous temperature environment, such a state can be avoided automatically, thereby preventing the self-propelled cleaner 1 from malfunctioning, heating, firing, smoking, or the like.

The self-propelled cleaner 1 can move to an area where the measured temperature does not exceed the set value in a method described below, for example. If the measured temperature is decided to be equal to or more than a set value, the self-propelled cleaner 1 is moved by a predetermined movement amount in a predetermined direction, the temperature is measured at the position. If the measured temperature is also equal to or more than the set value, the self-propelled cleaner 1 is further moved by the predetermined movement amount in the predetermined direction and this process is repeated.

(Abnormal Temperature Notification Process)

Next, an exemplary flow of a process (abnormal temperature notification process) for reporting abnormal temperature information using the self-propelled cleaner 1 according to the present embodiment will be described with reference to FIGS. 8 to 10.

Figure 8:
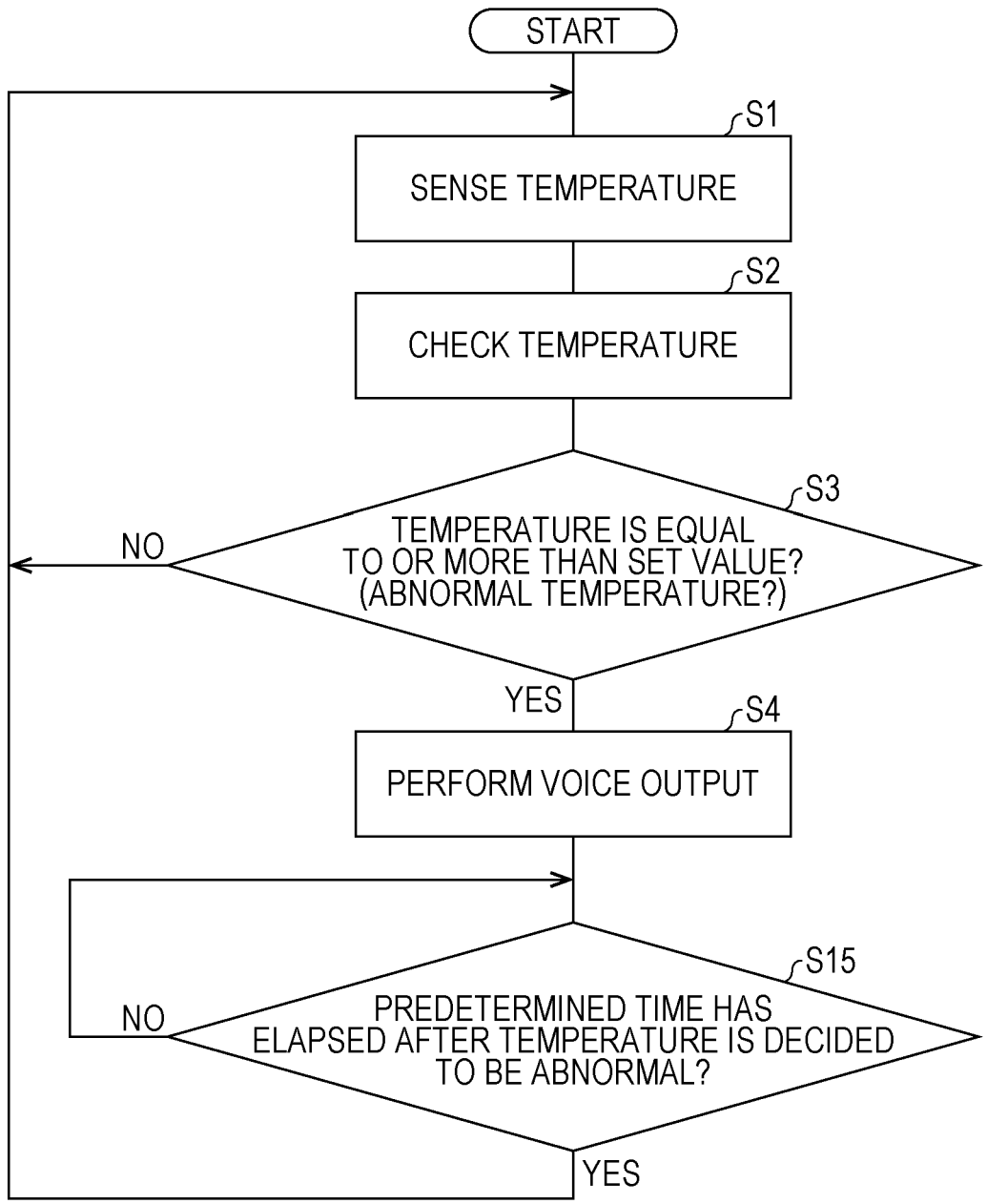
FIG. 8 is a flowchart showing an exemplary flow of an abnormal temperature notification process in the self-propelled cleaner.

As shown in FIG. 8, the self-propelled cleaner 1 first senses (measures) the temperature during self-propelled operation (S1), checks the temperature (S2), and decides whether the sensed (measured) temperature is equal to or more than a set value (whether the sensed temperature is an abnormal temperature) (S3). If the sensed temperature is equal to or more than the set value (YES in S3), voice output of abnormal temperature information is performed (S4). After deciding that the sensed temperature is equal to or more than the set value (the sensed temperature is an abnormal temperature), a decision is made as to whether a predetermined time has elapsed (S15). If the predetermined time has not elapsed (NO in S15), the processing is suspended until the predetermined time has elapsed. If the predetermined time has elapsed (YES in S15), the processing returns to S1 and the self-propelled cleaner 1 senses the temperature during self-propelled operation. If the sensed temperature is less than the set value (NO in S3), the processing returns to S1 and the temperature is sensed during self-propelled operation.

As described above, the self-propelled cleaner 1 executes a flow of notification with voice output when sensing a temperature equal to or more than the set value during self-propelled operation.

Next, reporting of abnormal temperature information through voice output and movement of the cleaner will be described with reference to FIG. 9.

Figure 9:
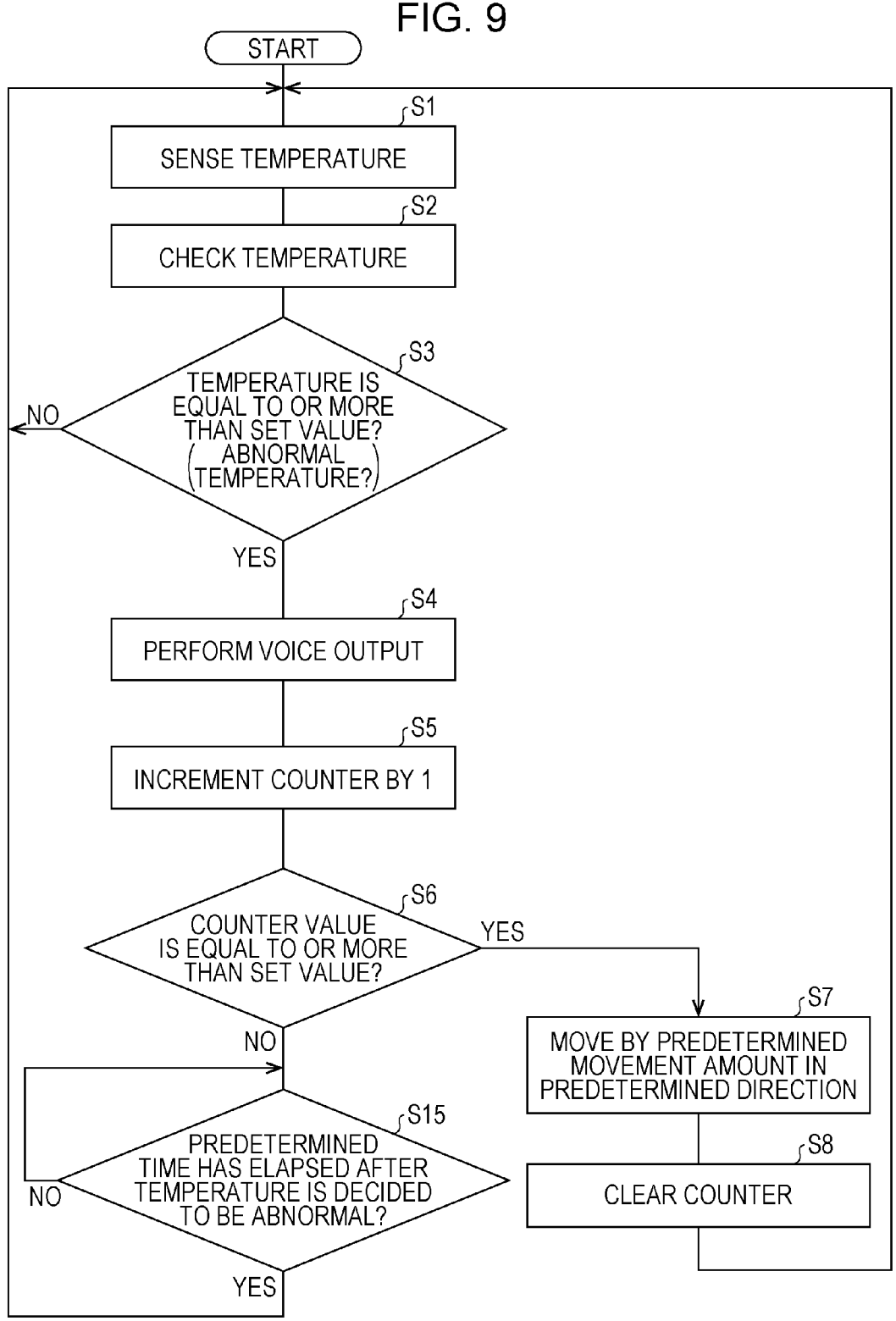
FIG. 9 is a flowchart showing another exemplary flow of the abnormal temperature notification process in the self-propelled cleaner.

In the process shown in FIG. 9, S1 to S4 and S15 are similar to the process described above. After voice output of abnormal temperature information is performed (S4), the counter is incremented by 1 (S5). That is, the self-propelled cleaner 1 counts the number of times voice output of abnormal temperature information is performed. Then, a decision is made as to whether the incremented counter value is equal to or more than a predetermined value (S6). If the incremented counter value is equal to or more than the predetermined value (YES in S6), the self-propelled cleaner 1 is moved by a predetermined movement amount in a predetermined direction (S7), the counter is cleared (S8), the processing returns to S1, and the temperature is sensed during self-propelled operation. If the incremented counter value is less than the predetermined value (NO in S6), the processing proceeds to S15.

If the incremented counter value is equal to or more than the predetermined value as described above, the self-propelled cleaner 1 is moved by a predetermined movement amount in a predetermined direction. Therefore, the situation can be avoided automatically. In addition, disposing the counter can prevent the movement for avoidance from occurring frequently.

The setting of the counter value may be 1, for example.

Next, the abnormal temperature notification process in which abnormal temperature information is reported through voice output and abnormal temperature information is reported to a terminal device will be described with reference to FIG. 10.

Figure 10:
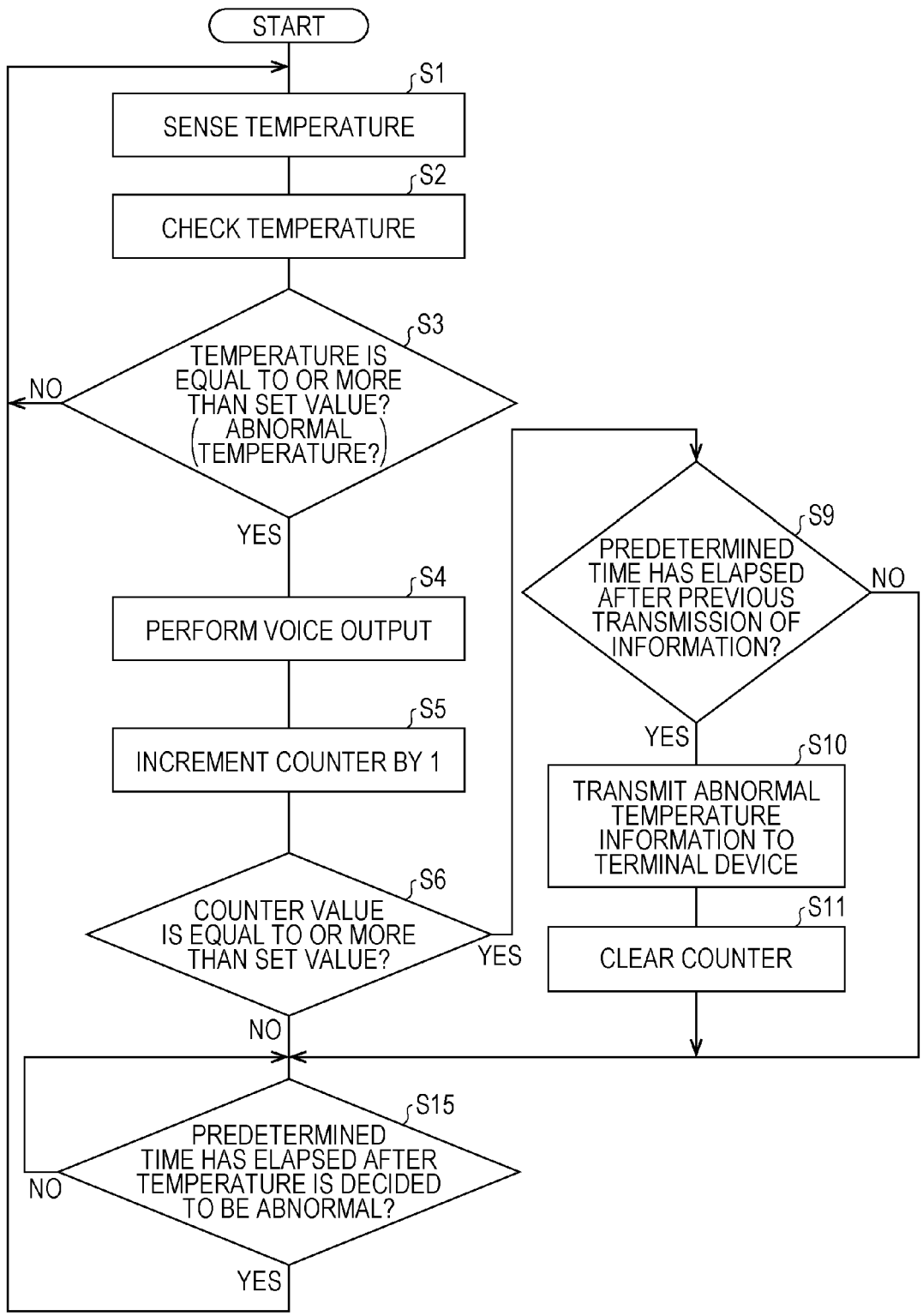
FIG. 10 is a flowchart showing a still another exemplary flow of the abnormal temperature notification process in the self-propelled cleaner.

In the abnormal temperature notification process shown in FIG. 10, S1 to S6 and S15 are similar to the process described above. If the counter value is equal to or more than a predetermined value (S6), a decision is made as to whether a predetermined time has elapsed from the previous transmission of abnormal temperature information (S9). If the predetermined time has elapsed (YES in S9), abnormal temperature information is transmitted to a terminal device (S10), the counter is cleared (S11), and the processing proceeds to S15. If the predetermined time has not elapsed (NO in S9), the processing also proceeds to S15. The setting of the counter value may be 1, for example.

If abnormal temperature information is transmitted to a terminal device while the counter value and the elapse of a predetermined time are checked, unnecessary reports can be omitted and appropriate reports are ensured.

Embodiment 2

Application of the self-propelled electronic device according to the present invention to a self-propelled air cleaner will be described with reference to the drawings.

Basically, a self-propelled air cleaner (electronic apparatus) 110 according the present embodiment does not have the cleaning function included in the self-propelled cleaner 1 according to embodiment 1, and has an air cleaning function. Accordingly, the components having the same functions as the components described in embodiment 1 are given the same numerals and their descriptions are omitted.
(Structure of a Self-Propelled Air Cleaner)

Figure 11:
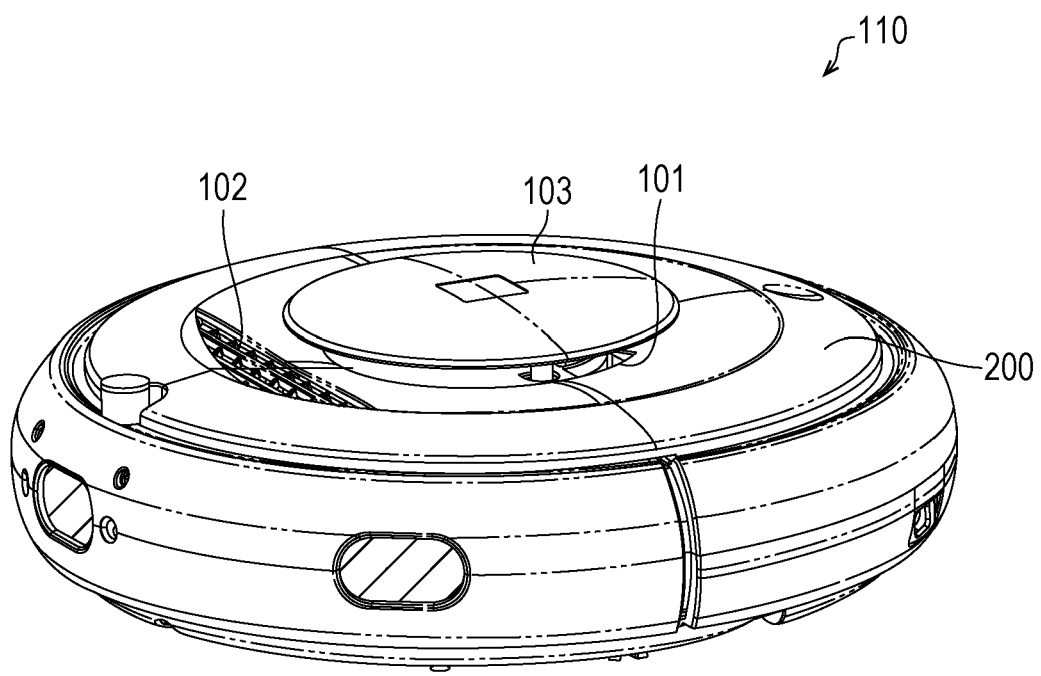
FIG. 11 is a perspective view of a self-propelled cleaner according to another embodiment of the present invention.
Figure 12:
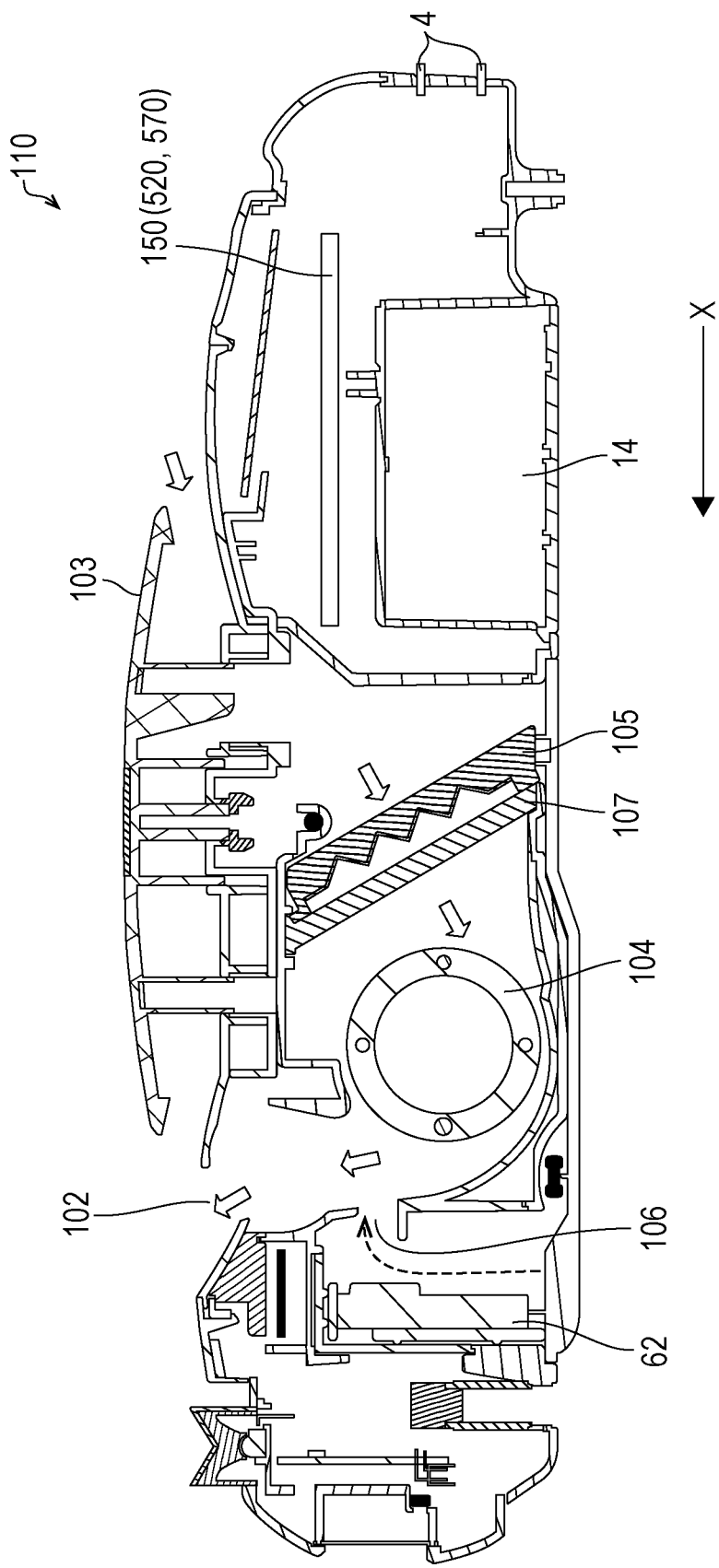
FIG. 12 is a side sectional view of the self-propelled cleaner.

FIGS. 11 and 12 are side a sectional view and a perspective view of the self-propelled air cleaner 110 according to the present embodiment, respectively.

The self-propelled air cleaner 110, which cleans air while being self-propelled, includes the main body of the self-propelled air cleaner 110, which is formed of a main body cabinet 200 having an outer frame of a circular shape in plan view as shown in FIG. 11, and driven wheels (not shown), which are driven by a battery (secondary battery) 14 as a power supplying source as shown in FIG. 12. The self-propelled air cleaner 110 rotates a rotary fan 104 using a motor to generate an air flow, passes air absorbed from an air inlet opening 101 through an internal filter 105, mix ions generated by the ion generating device 62, and evacuates it from an air outlet opening 102. The white arrows in FIG. 12 indicate an air flow when the rotary fan 104 rotates.

Figure 13:
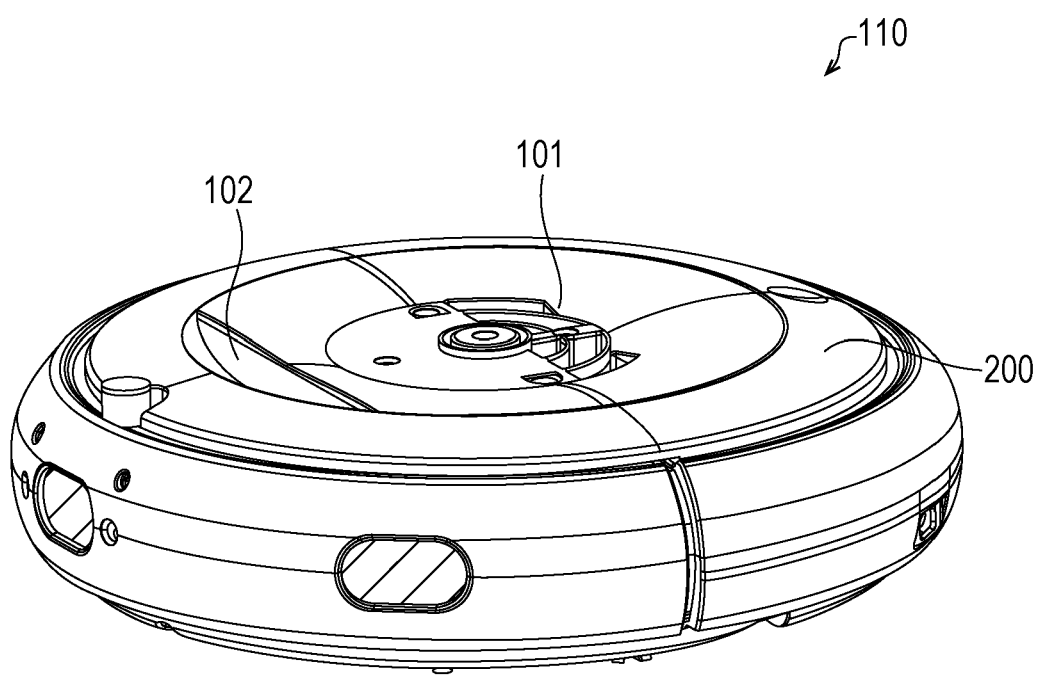
FIG. 13 is a perspective view of the self-propelled cleaner in a state in which an air inlet porter has been removed.

As shown in FIG. 11, an air inlet port 103 is disposed on an upper surface of the main body cabinet 200. The air inlet port 103 covers a part of an upper surface of the main body cabinet 200. The air inlet port 103 lowers to a position that blocks the air inlet opening 101 when the self-propelled air cleaner 110 stops so as to prevent foreign matter, dirt, dust, and so on from getting into the air inlet opening 101. FIG. 12 indicates a state in which the cleaner is operating and the air inlet port 103 is placed upward. When the air inlet port 103 is placed upward as shown in FIG. 12, air can be absorbed. FIG. 13 shows the state of the self-propelled air cleaner 110 in which the air inlet port 103 is removed from the main body cabinet 200. However, it is generally impossible to remove the air inlet port 103. As is not shown, an operation panel, which inputs an instruction to the self-propelled air cleaner 110, is disposed on the upper surface of the main body cabinet 200.

The filter 105 collects dirt and dust in air absorbed through the air inlet opening 101. The filter 105 is attached to the main body cabinet 200 using a filter holding member 107. A known filter such as, for example, a high efficiency particulate air (HEPA) filter or active carbon filter is used as the filter 105.

The ion generating device 62 generates ions and is disposed in the vicinity of the rotary fan 104 as shown in FIG. 12. This type of ion is Plasmacluster Ion®, for example. In the present embodiment, the ion generating device 62 is assumed to be a Plasmacluster Ion generating device. Accordingly, the ion generating device 62 has a Plasmacluster Ion generating element and the Plasmacluster Ion generating element includes a plus ion generating unit, which generates plus ions, and a minus ion generating unit, which generates minus ions. Note that such an ion generating element is disclosed in detail in Japanese Unexamined Patent Application Publication No. 2002-58731, which was previously applied by the applicant of the present invention.

Plus ions and minus ions generated by the ion generating device 62 are mixed with the air that has passed through the filter 105 and then released from the air outlet opening 102. Bacteria in the air are removed by the released plus ions and minus ions to clean the air.

The amount ion generation by the ion generating device 62 is controlled by a control unit 520, which will be described later.

The control unit 520 may change the amount of ion release by the ion generating device 62 depending on the operation state of the self-propelled air cleaner 110. For example, an odor sensor is provided to check whether the odor value is higher than a set value. If the odor value is higher than the set value, the proportion of the amount of release between plus ions and minus ions may be changed to increase the amount of release of minus ions. Minus ions are effective in deleting or removing odor. Accordingly, in an environment in which the odor value sensed by the odor sensor is higher than the set value, the amount of ion generation from the ion generating device 62 is changed so as to increase the amount of minus ion release and to release an air flow including more minus ions from the self-propelled air cleaner 110, thereby removing odor effectively.

The dotted line in FIG. 12 indicates a flow of ions generated by the ion generating device 62. Air including ions generated by the ion generating device 62 is evacuated from an absorption port 106, absorbed by an air flow generated by rotation of the rotary fan 104, and evacuated from the air outlet opening 102. In FIG. 12, the self-propelled air cleaner 110 moves from left to right on the drawing, as indicated by arrow X. Accordingly, the self-propelled air cleaner 110 absorbs air from the rear side with respect to the movement direction and evacuates it from the front side.

The ion generating device 62 does not need to generate ions at all times while the self-propelled air cleaner 110 moves. The self-propelled air cleaner 110 may have a mode for stopping the generation of ions or may increase the amount of ion generation when an attached odor sensor senses an odor value exceeding a set value.

In addition, a control board 150 is disposed in the main body cabinet 200. The control board 150 includes a the control unit 520, which controls each unit of the self-propelled air cleaner 110, and a storage unit 570. The control unit 520 controls various types of operation of the self-propelled air cleaner 110 based on a program and data stored in the storage unit 570 or a program and data input from an operation panel, remote control device, or a terminal device connected via radio communication.

The charging terminals 4 for charging the battery 14 are disposed in an exposed manner at the rear end of the circumferential surface (the side) of the main body cabinet 200. The self-propelled air cleaner 110 returns to the place where the charger 40 (see FIG. 6) with the power feeding terminals 41 is installed when air cleaning is completed or the amount of charge of the battery 14 becomes less than a predetermined value. Returning of the self-propelled air cleaner 110 and docking of the charging terminals 4 to the power feeding terminals 41 is performed in the same way as in the self-propelled cleaner 1 according to embodiment 1.

The self-propelled air cleaner 110 can be operated by an operation panel (not shown) attached thereto or a remote control device (not shown) via infrared communication such as IrDA, IrSS®, or the like. In addition, the self-propelled air cleaner 110 can also be operated via a terminal device (not shown) such as a smart phone, mobile phone, tablet terminal, connected through radio communication such as Bluetooth®, WiFi®, ZigBee®. In addition, data can be transmitted to a terminal device connected through radio communication from the self-propelled air cleaner 110. That is, the self-propelled air cleaner 110 can communicate with a terminal device connected through a radio frequency system bi-directionally. The self-propelled air cleaner 110 may be connected to a wide area wireless network. In this case, the self-propelled air cleaner 110 can be operated from a terminal device connected to the wide area wireless network. In addition, a voice input operation may be enabled for the self-propelled air cleaner 110.

If the operation of the self-propelled air cleaner 110 is instructed under control of the control unit 520, electric power is supplied from the battery 14 and the rotary fan 104, the ion generating device 62, and the driven wheels are driven.

In addition, the self-propelled air cleaner 110 according to the present embodiment has a temperature measurement unit (not shown), which measures the ambient temperature. If the ambient temperature of the self-propelled air cleaner 110 is equal to or more than a set value, abnormal temperature information indicating the fact is externally reported, under control of the control unit 520. The report is provided via voice output or transmitted to an external terminal device. The abnormal temperature information is handled in a manner similar to that for the self-propelled cleaner 1.

Accordingly, if the self-propelled air cleaner 110 according to the present embodiment decides an ambient temperature measured during self-propelled operation is equal to or more than a set value, the self-propelled air cleaner 110 also externally reports abnormal temperature information indicating that the measured ambient temperature is equal to or more than the set value. Accordingly, the self-propelled air cleaner 110 can report immediately and clearly to the user that the air cleaner is exposed to a dangerous temperature environment. The user can recognize that the self-propelled air cleaner 110 is exposed to a dangerous temperature environment and avoids the self-propelled air cleaner 110 from being exposed to such a state, thereby preventing the self-propelled air cleaner 110 from heating, firing, smoking, or the like, for example. This prevents the self-propelled air cleaner 110 from suffering a failure or accident. As described above, the self-propelled air cleaner 110 can ensure safety.

If the self-propelled air cleaner 110 approaches a stove or other heat sources that are generating heat, the self-propelled air cleaner 110 releases ions in the opposite direction, thereby preventing the air cleaning function from degrading due to heat generation of the heat source.

The electronic device according to the present invention is applicable to a self-propelled air cleaner that cleans air without generating ions.

The abnormal temperature notification process of a self-propelled cleaner or self-propelled air cleaner has been described in the above embodiment, but such an abnormal temperature notification process is applicable to various types of self-propelled electronic devices.

Embodiment 3

The control unit 52 of the self-propelled cleaner 1 and the control unit 520 of the self-propelled air cleaner 110 may be configured by hardware logic or by software using a CPU.

That is, the self-propelled cleaner 1 or the self-propelled air cleaner 110 includes a central processing unit (CPU), which executes instructions in a program that achieve various functions, a ROM (read only memory), which stores the above program, a RAM (random access memory), in which the above program is expanded, a storage device (recording medium) such as memory, which stores the above program and various types of data, and so on. The object of the present invention can also be achieved by supplying, to the self-propelled cleaner 1 or the self-propelled air cleaner 110, a recording medium that records, in a readable manner, program codes (executable program, intermediate code program, and source program) of the control program of the self-propelled cleaner 1 or the self-propelled air cleaner 110, which is software that achieves the above function, and by causing the computer (or the CPU or MPU) to read and execute the program codes recorded in the recording medium.

As the above recording medium, for example, various types of tapes such as a magnetic tape and cassette tape, various types of disks such as magnetic disks including Floppy® disk and hard disk and optical disk including CD-ROM, MO, MD, DVD, and CD-R, various types of cards such as an IC card (including a memory card) and optical card, and various types of semiconductor memories such as a mask ROM, EPROM, EEPROM, and flash ROM, and various types of logical circuits such as a programmable logic device (PLD).

The self-propelled cleaner 1 or the self-propelled air cleaner 110 may be configured so as to be connectable to a communication network and the above program code may be supplied via the communication network. The communication network is not limited to a particular example and, for example, the Internet, an intranet, an extranet, a LAN, an ISDN, a VAN, a CATV communication network, a virtual private network, a telephone line network, a mobile communication network, a satellite communication network, and so on can be used. The transmission medium constituting the communication network is not limited to a particular example and, for example, a wired medium such as IEEE1394, USB, power line communication, a cable television line, a telephone line, ADSL line or a wireless medium such as an infrared medium such as IrDA or remote control, Bluetooth®, IEEE802.11 radio medium, High Data Rate (HDR), Near Field Communication (NFC), Digital Living Network Alliance (DLNA), a mobile phone network, a satellite network, or a terrestrial digital network. The present invention can also be achieved in the form of computer data signals embedded in a carrier wave concretized by electronically transferring the above program codes.

SUMMARY

The self-propelled electronic device (self-propelled cleaner or self-propelled air cleaner) according to the present invention addresses the above problems with the object of providing a self-propelled electronic device with a travel driving unit. The self-propelled electronic device includes a temperature measurement unit that measures ambient temperature during self-propelled operation, a temperature decision unit that decides whether the ambient temperature measured by the temperature measurement unit is equal to or more than a set value, and an abnormal temperature notification unit that reports abnormal temperature information indicating that the measured ambient temperature is equal to or more than the set value if the temperature decision unit decides that the measured ambient temperature is equal to or more than the set value.

With the above structure, if the self-propelled electronic device decides an ambient temperature measured during self-propelled operation is equal to or more than a set value, the self-propelled electronic device can externally report abnormal temperature information indicating that the measured ambient temperature is equal to or more than the set value. This prompts the user to avoid the self-propelled electronic device from being exposed to a dangerous temperature environment.

As described above, with the above structure, the self-propelled electronic device can report immediately and clearly to the user that the self-propelled electronic device is exposed to a dangerous temperature environment. The use can recognize that the self-propelled electronic device is exposed to a dangerous temperature environment and avoids the self-propelled electronic device from being exposed to such a state, thereby preventing the self-propelled electronic device from heating, firing, smoking, or the like, for example. This prevents the self-propelled electronic device from suffering a failure or accident. As described above, with the above structure, the self-propelled electronic device with a high level of safety can be provided.

The set temperature value may be set during shipment of the self-propelled electronic device or may be set by the user as necessary. Note that temporary stop and emergency stop are also assumed to be self-propelled operation.

The self-propelled electronic device according to the present invention may include, in addition to the above structure, a voice output unit, in which the abnormal temperature notification unit may cause the voice output unit to output the abnormal temperature information as voice information.

With the above structure, it is possible to externally report abnormal temperature information indicating that the measured temperature is equal to or more than a set value, as voice information. This prompts the user to avoid the self-propelled electronic device from being exposed to a dangerous temperature environment. The user can recognize that the self-propelled electronic device is exposed to a dangerous temperature environment and avoid the self-propelled electronic device from being exposed to such a state.

The self-propelled electronic device according to the present invention may include, in addition to the above structure, a data communication unit that performs data communication with the external terminal device, in which the abnormal temperature notification unit may cause the data communication unit to transmit the abnormal temperature information to the external terminal device.

With the above structure, it is possible to report abnormal temperature information indicating that the measured temperature is equal to or more than a set value to an external terminal device. This prompts the user to avoid the self-propelled electronic device from being exposed to a dangerous temperature environment. The use can recognize that the self-propelled electronic device is exposed to a dangerous temperature environment and avoids the self-propelled electronic device from being exposed to such a state, thereby preventing the self-propelled electronic device from malfunctioning. The terminal device may be a mobile terminal device that can be carried, such as, for example, a smart phone, mobile phone, or tablet terminal. Reporting to the terminal device may be performed by email. Alternatively, the application of a terminal device that has received abnormal temperature information may perform voice output or display output of the information.

The self-propelled electronic device according to the present invention may include, in addition to the above structure, a measurement control unit that decides whether a certain time has elapsed after the temperature decision unit decides that the measured temperature is equal to or more than the set value and, if the certain time has elapsed, causes the temperature measurement unit to perform temperature control again.

In the above structure, if the measured temperature is decided to be equal to or more than the set value, abnormal temperature is externally reported. After elapse of the certain time, the temperature is measured again and, if the measured temperature is equal to or more than the set value, abnormal temperature information can be transmitted externally again. Accordingly, if the self-propelled electronic device is not avoided from the dangerous temperature state even when the temperature is measured again, it is possible to prompt the user to further avoid the state. On the other hand, if the ambient temperature measured is less than the set value, it is not necessary to externally report abnormal temperature information, thereby avoiding the transmission of unnecessary reports. In addition, the user can recognize that the self-propelled electronic device can be avoided from the dangerous temperature state.

The self-propelled electronic device according to the present invention may include, in addition to the above structure, a travel driving control unit that, if the temperature decision unit decides that the measured temperature is equal to or more than the set value, causes the travel driving unit to move the self-propelled electronic device to an area where the measured temperature does not exceed a set value of the measured temperature.

With the above structure, if the measured temperature is equal to or more than the set value during self-propelled operation, the self-propelled electronic device can move to an area where the measured temperature does not exceed the set value. Accordingly, even if the self-propelled electronic device is exposed to a dangerous temperature environment, such a state can be avoided automatically, thereby preventing the self-propelled electronic device from malfunctioning, heating, firing, smoking, or the like.

The self-propelled electronic device according to the present invention may also include a cleaning function or an air cleaning function in addition to the above structure.

With the above structure, the self-propelled electronic device that performs cleaning or air cleaning during self-propelled operation can report abnormal temperature information indicating that the measured temperature is equal to or more than a set value externally to prompt the user to avoid the self-propelled electronic device from being exposed to a dangerous temperature environment.

The self-propelled electronic device according to the present invention may include an ion generating unit in addition to the above structure and may release ions generated by the ion generating unit together with air released from the self-propelled electronic device.

With the above structure, generation and release of ions enable effective sterile filtration and deodorization around the self-propelled electronic device during self-propelled operation.

A centralized control unit for centrally controlling the above components of the self-propelled electronic device according to the present invention may be achieved by a computer. In this case, since a computer is operated as the centralized control unit for centrally controlling the above components of the self-propelled electronic device, a program for achieving the centralized control unit of the self-propelled electronic device as a computer and a computer-readable recording medium that stores the program are also included in the scope of the present invention.

The present invention is not limited to the above embodiments and various modifications can be made. Embodiments obtained by appropriately combining technical means disclosed for different embodiments are also included in the technical range of the present invention. In addition, a new technical characteristic can be created by combining technical means disclosed for embodiments.

INDUSTRIAL APPLICABILITY

The present invention is applicable to self-propelled electronic devices such as, for example, a self-propelled cleaner and self-propelled air cleaner.

REFERENCE SIGNS LIST 1 self-propelled cleaner (self-propelled electronic device)
2 main body cabinet
4 charging terminal
5 bumper
14 battery
15 control board
29 driven wheel
40 charger
41 power feeding terminal
52 control unit
53 data communication unit
55 voltage detection unit
56 voice output unit
57 storage unit
58 travel driving unit
61 air blowing device
62 ion generating device
63 temperature measurement unit
101 air inlet opening
102 air outlet opening
104 rotary fan
105 filter
110 self-propelled air cleaner (self-propelled electronic device)
150 control board
200 main body cabinet
520 control unit
521 temperature decision unit
522 abnormal temperature notification unit
523 measurement control unit
524 travel driving control unit
570 storage unit
C center line (center axis)

The invention claimed is:

1. A self-propelled electronic device including a travel drive, a surface cleaner, and an air cleaner, comprising:
a temperature measurement sensor that measures an ambient temperature during a time of self-propelled operation while surface cleaning or air cleaning;
temperature decision circuitry that decides whether the ambient temperature measured by the temperature measurement sensor is equal to or more than a set value;
abnormal temperature notification circuitry that externally reports abnormal temperature information indicating that the measured ambient temperature is equal to or more than the set value if the temperature decision circuitry decides that the measured ambient temperature is equal to or more than the set value; and
travel driving control circuitry that controls the travel drive to move the self-propelled electronic device in a predetermined direction; wherein
when the temperature decision circuitry decides during the time of self-propelled operation that the ambient temperature measured by the temperature measurement sensor is equal to or more than the set value, the travel driving control circuitry controls the travel drive to move the self-propelled electronic device to an area where the ambient temperature measured by the temperature measurement sensor is not equal to or more than the set value.

2. The self-propelled electronic device according to claim 1, further comprising:
a voice output speaker, wherein
the abnormal temperature notification circuitry causes the voice output speaker to output the abnormal temperature information as voice information.

3. The self-propelled electronic device according to claim 1, further comprising:
data communication circuitry that performs data communication with an external terminal device, wherein
the abnormal temperature notification circuitry causes the data communication circuitry to transmit the abnormal temperature information to the external terminal device.

4. The self-propelled electronic device according to claim 3, transmitting, as the abnormal temperature information, information that causes the terminal device to output a voice indicating that the self-propelled electronic device is exposed to a dangerous temperature environment or information that causes the terminal device to display an image indicating that the self-propelled electronic device is exposed to a dangerous temperature environment, to the terminal device.

5. The self-propelled electronic device according to claim 1, further comprising:
measurement control circuitry that decides whether a certain time has elapsed after the temperature decision circuitry decides that the measured temperature is equal to or more than the set value and, if the certain time has elapsed, causes the temperature measurement circuitry to perform temperature control again.

6. The self-propelled electronic device according to claim 1, wherein
the travel driving control circuitry counts the number of times the abnormal temperature notification circuitry has externally reported the abnormal temperature information and, if the counted number of times exceeds a set value of the reported number of times, causes the travel drive to move the self-propelled electronic device to the area where the measured temperature does not exceed the set value of the measured temperature.

7. The self-propelled electronic device according to claim 1, further comprising:
an ion generator, wherein
ions generated by the ion generator are released together with air released from the self-propelled electronic device.

* * * * *